Figure 1:
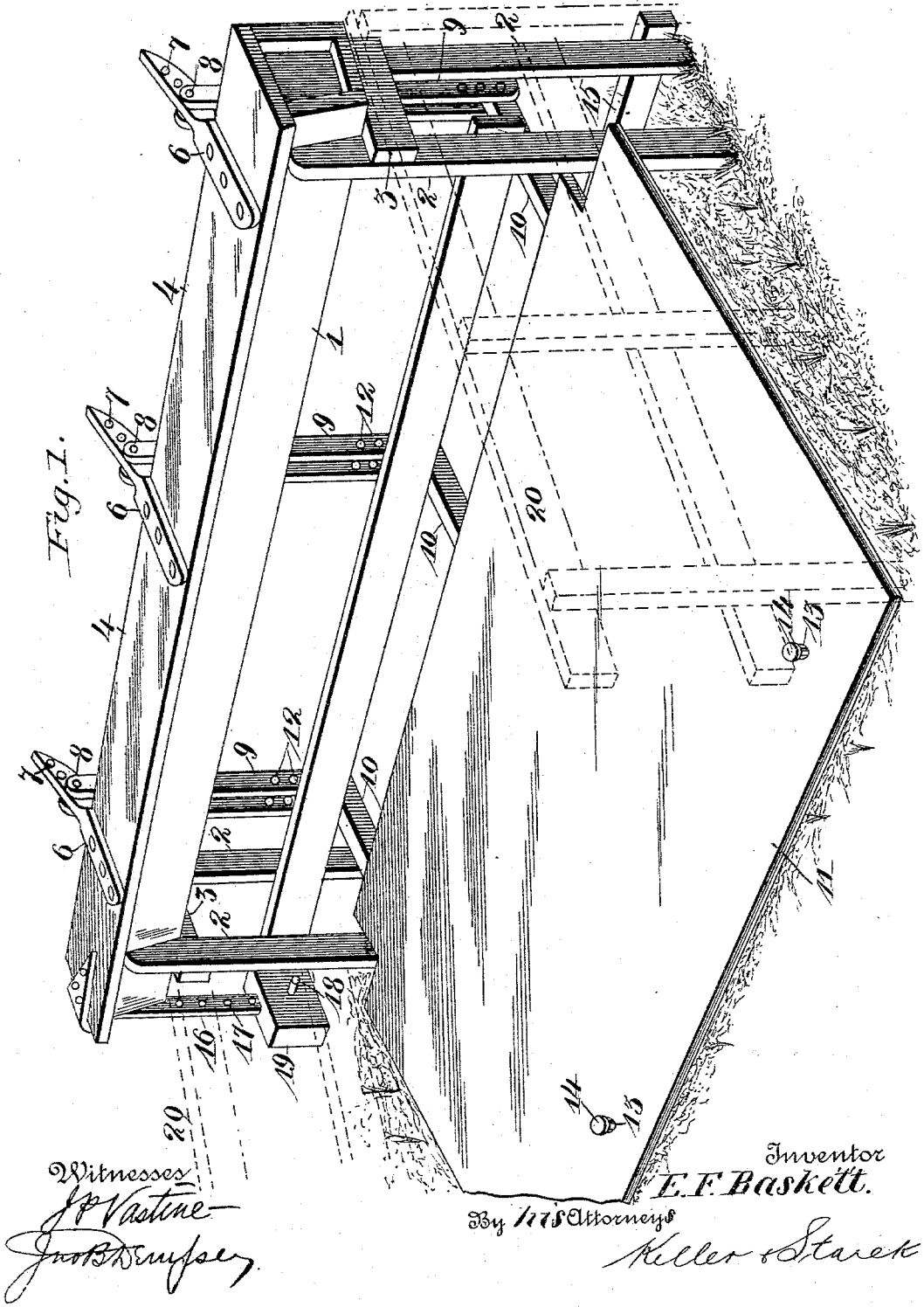

(No Model.) 2 Sheets—Sheet 1.
E. F. BASKETT.
TROUGH FOR SALTING STOCK.

No. 490,095. Patented Jan. 17, 1893.

Witnesses
J P Vastine
Jno B Dempsey

Inventor
E. F. Baskett.
By his Attorneys
Keller & Starek (No Model.) 2 Sheets—Sheet 2.
E. F. BASKETT.
TROUGH FOR SALTING STOCK.
No. 490,095. Patented Jan. 17, 1893.
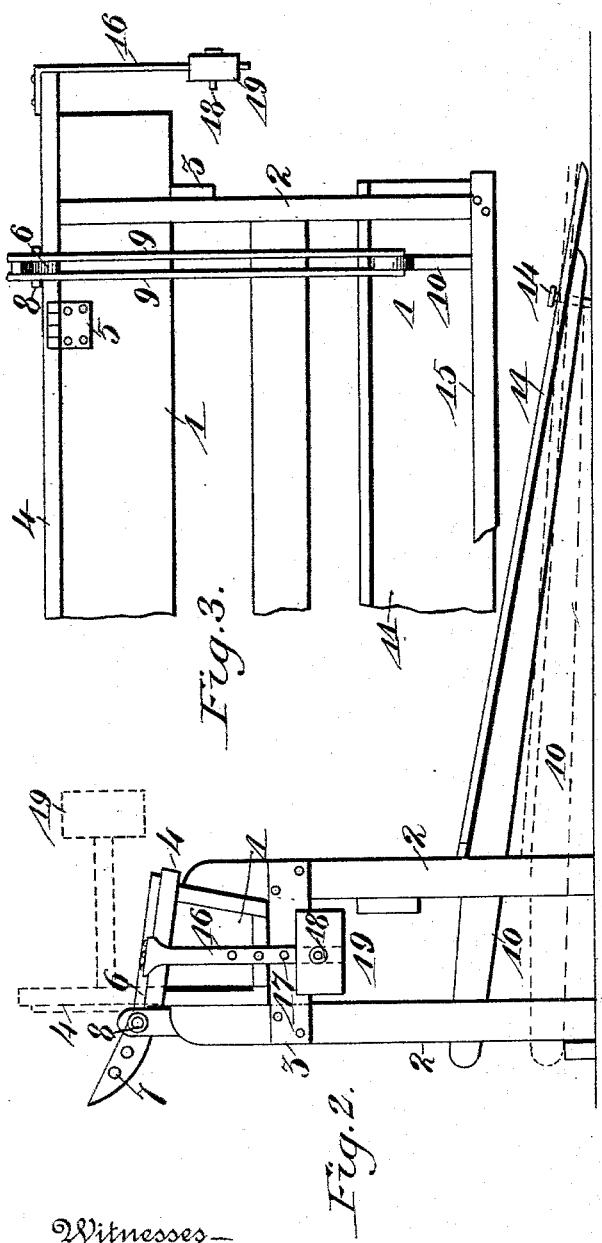
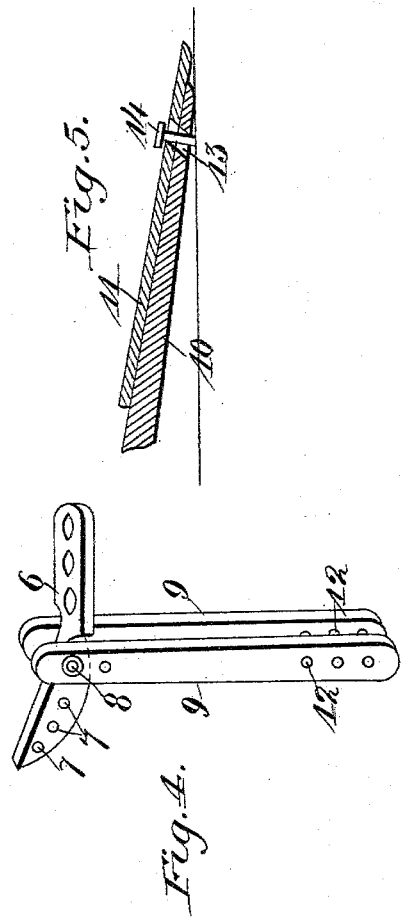
Witnesses
Inventor
E. F. Baskett.
By his Attorneys
Keller & Stuck

UNITED STATES PATENT OFFICE.

ELISHA F. BASKETT, OF McFALL, MISSOURI.

TROUGH FOR SALTING STOCK.

SPECIFICATION forming part of Letters Patent No. 490,095, dated January 17, 1893.

Application filed September 28, 1892. Serial No. 447,124. (No model.)

*To all whom it may concern:*

Be it known that I, ELISHA F. BASKETT, of McFall, county of Gentry, and State of Missouri, have invented certain new and useful Improvements in Troughs for Salting Stock, of which the following is a full, clear, and exact description, reference being had to the accompanying drawings, forming a part hereof.

My invention relates to improvements in troughs for salting stock, and it consists in the novel combination and arrangement of parts, as will be hereinafter more fully described and designated in the claims.

In the drawings:—Figure 1, is a perspective view of my complete invention. Fig. 2, is a side elevation of the same. Fig. 3, is a rear elevation of the invention with parts broken away showing one end of the same. Fig. 4, is a perspective view of one of the bearers and its connecting arms attached to the same. and, Fig. 5, is a vertical longitudinal section of the lower end of the platform, showing means for attaching the same to the ground.

The trough herein shown and to be described is so constructed and arranged that when the stock steps upon the movable platform the lid or cover of the said trough will automatically open and consequently allow the stock to feed on the salt contained in the trough. When the stock steps off of the platform the cover of the trough will close upon the same by the employment of a weight and thus prevent the rain and snow from washing the salt away.

It also consists in other details hereinafter described.

Referring to the drawings:—1, represents a trough of suitable dimensions and is so shaped that the stock can conveniently eat out of the same. Said trough is arranged at a suitable distance from the ground, and is supported upon posts 2, the lower ends of which are fixed in the ground as best shown in Fig. 1.

3, represents short transverse pieces which are fixed to the sides of the said posts for strengthening the same and upon which partially rests the bottom of the trough.

4, represents the cover for the trough which is hinged thereto at its rear upper edge by hinges 5, for holding the cover in position and allowing the same to be elevated. The said cover extends somewhat beyond the front edge of the trough in order to allow the rain to drip off.

To the top of the cover 5, are secured three metallic bearers 6, the rear ends of which are formed at an incline and project a suitable distance beyond the rear edge of the cover. The said rear ends of the bearers are provided with openings 7, for the passage of a pin 8, carried by the connecting arms 9, whereby more leverage may be had when occasion demands. The connecting arms 9, are arranged in pairs two being attached to one of the bearers the lower ends of which are movably attached to the projecting ends of the transverse pieces 10, secured to the under surface of the platform 11. The said connecting arms 9, are provided with a suitable number of openings 12, whereby the height of the platform next to the trough may be adjusted.

The platform 11, is of suitable dimensions and is provided with two or more openings 13, near its front edge through which are passed metallic stops or pins 14, for securing the said platform movably to the ground.

To the rear posts 2, and adjacent to the ground is fastened a longitudinal piece 15, upon the upper edge of which rest the projecting ends of the transverse pieces 10, when the platform is in its lowest position, as shown in dotted lines Fig. 2, relieving the cover and its hinges of all weight. To one end of the cover 4, is secured a metallic arm 16, which is perpendicular when the said cover is in its normal position or closed but assumes a horizontal position when the cover is open as shown in dotted lines Fig. 2. The said arm is provided with a suitable number of circular openings 17, for the passage of a pin 18, carried by the weight 19. Thus it will be seen that the said weight is adjustable upon said arm and accordingly the weight required to close the cover may be adjusted.

In practice the device is located in the pasture in such a manner that the trough of the same is next to the fence of the pasture, and further I construct short fences 20, and arrange them on either side of the device as shown in dotted lines Fig. 1, the length of which may be a trifle longer than the width of the platform, by which means the stock is compelled to walk upon the platform in the proper direction.

From the foregoing description it will be seen that when the stock walk upon the movable platform the weight of the same will cause the platform to fall pulling down upon the rear extensions of the bearers 6, by the employment of the connecting arms 9, and elevate the front end of the cover and also the weight 19. When the stock walk off the platform the weight 19, will cause the cover 4, to close upon the trough 1, and assume its normal positton.

What I claim is:—

1. A trough for salting stock consisting of a platform movably secured to the ground, posts fixed into the ground and supporting a trough, bearers attached to a hinged cover the ends of which project, connecting arms attached to the said platform and bearers, an arm attached to one end of the cover and provided with openings, and a weight adjustable upon said arm for closing the cover, substantially as described.

2. A trough for salting stock, consisting of a platform movably secured to the ground, transverse pieces 10, secured to the same and projecting a suitable distance, a hinged cover 4, for the said trough, bearers 6, fastened to the said cover and projecting beyond the same, connecting arms 9, attached to the said bearers and pieces 10, respectively, an arm 16, attached to one end of the said cover, and a weight 19, adjustable upon said arm, for closing the cover upon the trough, substantially as described.

3. A trough for salting stock, consisting of a platform 11, pins 14, passed through the same and into the ground, transverse pieces 10, fastened to the said platform and projecting a suitable distance, posts 2, supporting a trough, a longitudinal piece 15, secured to the said posts upon which rest the end of pieces 10, a cover 4, hinged to the said trough, bearers 6, fastened to the said cover and projecting beyond the same, and having holes therein connecting arms 9, movably attached to said bearers and ends of pieces 10, an arm 16, attached to one end of the said cover and provided with openings 17, a weight 19, adjustable upon said arm, and a pin 18, for holding said weight upon said arm, substantially as described.

In testimony whereof I affix my signature in presence of two witnesses.

ELISHA F. BASKETT.

Witnesses:
JOHN H. MEYER,
E. E. MANNING.